US012785146B2

(12) United States Patent
Cho et al.

(10) Patent No.: US 12,785,146 B2
(45) Date of Patent: Nov. 3, 2026

(54) NON-AQUEOUS ELECTROLYTE AND LITHIUM SECONDARY BATTERY INCLUDING THE SAME

(71) Applicant: SK ON CO., LTD., Seoul (KR)

(72) Inventors: In Haeng Cho, Daejeon (KR); Moon Sung Kim, Daejeon (KR); Sung Jin Kim, Daejeon (KR); Jin Hong Lee, Daejeon (KR); Min Young Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 768 days.

(21) Appl. No.: 18/090,287

(22) Filed: Dec. 28, 2022

(65) Prior Publication Data

US 2023/0207880 A1 Jun. 29, 2023

(30) Foreign Application Priority Data

Dec. 28, 2021 (KR) ........................ 10-2021-0190005

(51) Int. Cl.
*H01M 10/0567* (2010.01)
*H01M 10/0568* (2010.01)
*H01M 10/0569* (2010.01)

(52) U.S. Cl.
CPC ... *H01M 10/0567* (2013.01); *H01M 10/0568* (2013.01); *H01M 10/0569* (2013.01); *H01M 2300/0034* (2013.01); *H01M 2300/0042* (2013.01)

(58) Field of Classification Search
CPC ......... H01M 10/0567; H01M 10/0568; H01M 10/0569; H01M 2300/0034; H01M 2300/0037; H01M 2300/004; H01M 2300/0042
See application file for complete search history.

(56) References Cited

U.S. PATENT DOCUMENTS

2016/0087307 A1* 3/2016 Burkhardt ......... H01M 10/0569 429/200

FOREIGN PATENT DOCUMENTS

| | | | |
|---|---|---|---|
| CN | 111883839 | A | 11/2020 |
| EP | 3890090 | A1 | 10/2021 |
| JP | 2020-77456 | A | 5/2020 |
| KR | 10-2017-0042324 | A | 4/2017 |
| KR | 10-2017-0063721 | A | 6/2017 |
| KR | 10-2019-0047004 | A | 5/2019 |
| KR | 1020190062228 | A | 6/2019 |
| KR | 1020190119615 | A | 10/2019 |
| KR | 1020210006414 | A | 1/2021 |
| KR | 1020210026499 | A | 3/2021 |

(Continued)

OTHER PUBLICATIONS

Extended European Search Report issued by EPO for Application No. 22216822.1, dated Jul. 6, 2023.

(Continued)

*Primary Examiner* — Christopher P Domone
(74) *Attorney, Agent, or Firm* — IP&T GROUP LLP

(57) ABSTRACT

A non-aqueous electrolyte according to embodiments of the present invention includes a non-aqueous organic solvents including a monofluoro-based organic solvent and a difluoro-based organic solvent, a lithium salt, and an additive. A weight ratio of the difluoro-based organic solvent relative to the monofluoro-based organic solvent exceeds 3 and is 11 or less.

10 Claims, 1 Drawing Sheet

(56) References Cited

FOREIGN PATENT DOCUMENTS

| | | | | |
|---|---|---|---|---|
| WO | 2016025589 | A1 | | 2/2016 |
| WO | 2016/044088 | A1 | | 3/2016 |
| WO | 2018050652 | A1 | | 3/2018 |
| WO | WO2019042741 | | * | 3/2019 |
| WO | 2020067370 | A1 | | 4/2020 |

OTHER PUBLICATIONS

Office Action for Korean Patent Application No. 10-2021-0190005 issued by the Korean Patent Office on Dec. 2, 2025.
Notice of Allowance for Korean Patent Application No. 10-2021-0190005 issued by the Korean Patent Office on Jul. 3, 2026.

* cited by examiner

NON-AQUEOUS ELECTROLYTE AND LITHIUM SECONDARY BATTERY INCLUDING THE SAME

CROSS-REFERENCE TO RELATED APPLICATION AND CLAIM OF PRIORITY

This application claims priority to Korean Patent Applications No. 10-2021-0190005 filed on Dec. 28, 2021 in the Korean Intellectual Property Office (KIPO), the entire disclosure of which is incorporated by reference herein.

BACKGROUND

1. Field

The present invention relates to a non-aqueous electrolyte and a lithium secondary battery including the same. More particularly, the present invention relates to a non-aqueous electrolyte including a non-aqueous solvent and an additive, and a lithium secondary battery including the same.

2. Description of the Related Art

A secondary battery which can be charged and discharged repeatedly has been widely employed as a power source of a mobile electronic device such as a camcorder, a mobile phone, a laptop computer. Recently, a battery pack including the secondary battery is being developed and applied as a power source of an eco-friendly automobile such as a hybrid vehicle.

A lithium secondary battery is highlighted and developed among various types of secondary batteries due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape for accommodating the electrode assembly and the electrolyte.

A lithium metal oxide may be used as an active material for a cathode of a lithium secondary battery. Examples of the lithium metal oxide include a nickel-based lithium metal oxide.

As an application range of the lithium secondary batteries is expanded, enhanced life-span, and higher capacity and operational stability are required. Accordingly, a lithium secondary battery that provides uniform power and capacity even during repeated charging and discharging is preferable.

However, power and capacity may be decreased due to surface damages of the nickel-based lithium metal oxide used as the cathode active material, and side reactions between the nickel-based lithium metal oxide and the electrolyte may occur.

For example, as disclosed in Korean Published Patent Application No. 10-2019-0119615, etc., a method for improving battery properties by modifying a non-aqueous electrolyte for a lithium secondary battery is being researched.

SUMMARY

According to an aspect of the present invention, there is provided a non-aqueous electrolyte providing improved mechanical and chemical stability.

According to an aspect of the present invention, there is provided a lithium secondary including the non-aqueous electrolyte and having improved operational stability and electrical property.

A non-aqueous electrolyte includes a non-aqueous organic solvent including a monofluoro-based organic solvent and a difluoro-based organic solvent, a lithium salt and an additive. A weight ratio of the difluoro-based organic solvent relative to the monofluoro-based organic solvent exceeds 3 and is 11 or less.

In some embodiments, the monofluoro-based organic solvent may be represented by Chemical Formula 1:

$$F—R^1$$ [Chemical Formula 1]

In Chemical Formula 1, $R^1$ is a substituted or unsubstituted $C_1$-$C_6$ alkyl group, a substituted or unsubstituted $C_6$-$C_{12}$ aryl group, a substituted or unsubstituted $C_5$-$C_{12}$ cycloalkyl group, a substituted or unsubstituted $C_5$-$C_{12}$ cycloalkenyl group, a substituted or unsubstituted 5 to 7 membered heterocycloalkyl group, or a substituted or unsubstituted 5 to 7 membered heterocycloalkenyl group.

In some embodiments, the difluoro-based organic solvent may be represented by Chemical Formula 2.

[Chemical Formula 2]

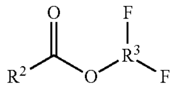

In Chemical Formula 2, $R^2$ is a hydrocarbon containing a substituted or unsubstituted $C_1$-$C_6$ alkyl group or a substituted or unsubstituted $C_6$-$C_{12}$ aryl group, and $R^3$ is a hydrocarbon containing a substituted or unsubstituted $C_1$-$C_6$ alkyl group or a substituted or unsubstituted $C_1$-$C_6$ alkenyl group.

In some embodiments, the additive may include a boron-based compound.

In some embodiments, the boron-based compound may include at least one of lithium bis(oxalate) borate (LiBOB), tris(trimethylsilyl) borate (TMSB) and lithium difluoro(oxalato) borate (LiFOB).

In some embodiments, a content of the additive may be in a range from 0.1 wt % to 1.0 wt % based on a total weight of the non-aqueous electrolyte.

In some embodiments, the non-aqueous electrolyte may further include an auxiliary additive including an alkyl sultone-based compound and an alkenyl sultone-based compound.

In some embodiments, a content of the auxiliary additive may be in a range from 0.8 wt % to 1.6 wt % based on a total weight of the non-aqueous electrolyte.

In some embodiments, the lithium salt may include at least one of lithium tetrafluoroborate ($LiBF_4$), lithium hexafluorophosphate ($LiPF_6$) and lithium difluorophosphate ($LiPO_2F_2$).

In some embodiments, the weight ratio of the difluoro-based organic solvent relative to the monofluoro-based organic solvent may be in a range from 4.5 to 9.

A lithium secondary battery includes a cathode, an anode facing the cathode and the non-aqueous electrolyte according to embodiments as described above. A non-aqueous electrolyte solution according to exemplary embodiments includes a non-aqueous organic solvent including a monofluoro-based organic solvent and a difluoro-based organic solvent, and a weight ratio of the difluoro-based relative to the monofluoro-based organic solvent may exceed 3, and may be 11 or less. In this case, a fluorine content may be appropriately controlled while sufficiently improving an oxidation resistance and a chemical resistance of a secondary battery. Accordingly, a decrease of a capacity retention may be prevented while improving high-temperature storage and life-span properties of the secondary battery.

In some embodiments, the non-aqueous electrolyte solution may include a fluorine-based compound in a predetermined content range as an additive. In this case, an excessive increase of a battery resistance may be prevented while further improving the high-temperature storage and life-span properties.

In some embodiments, the non-aqueous electrolyte solution may further include an auxiliary additive including an alkyl sultone-based compound and an alkenyl sultone-based compound in a predetermined amount range. In this case, side reactions of the additive may be suppressed while suppressing an excessive increase of the battery resistance. Accordingly, a capacity reduction may be suppressed while maintaining or improving the improving high-temperature storage and life-span characteristics of the secondary battery from the above-described monofluoro-based organic solvent and the difluoro-based organic solvent.

DETAILED DESCRIPTION OF THE EMBODIMENTS

Figure 1:
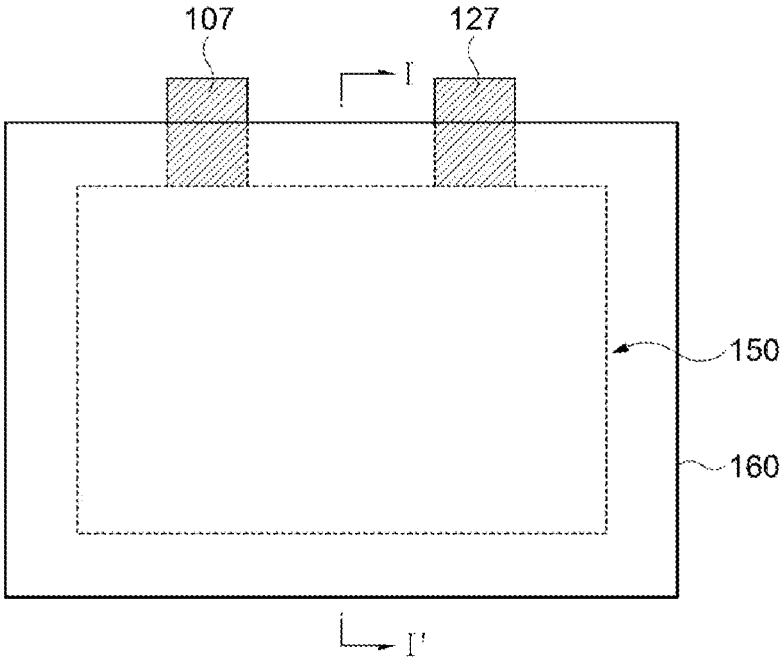
FIGS. 1 and 2 are a schematic plan view and a schematic cross-sectional view, respectively, illustrating a lithium secondary battery in accordance with exemplary embodiments.

According to embodiments of the present invention, a non-aqueous electrolyte including an organic solvent, a lithium salt and an additive is provided. According to embodiments of the present invention, a lithium secondary battery including the non-aqueous electrolyte and having improved low-temperature capacity properties and high-temperature life-span properties is also provided.

In exemplary embodiments, the non-aqueous electrolyte may include a non-aqueous organic solvent, a lithium salt and an additive.

For example, the non-aqueous organic solvent may include an organic compound that may provide sufficient solubility for the lithium salt, the additive and an auxiliary additive and may not have a reactivity with the lithium secondary battery.

In exemplary embodiments, the non-aqueous organic solvent may include a monofluoro-based organic solvent and a difluoro-based organic solvent.

The term "monofluoro-based organic solvent" used herein may refer to a compound containing one fluorine (F) atom in one molecule, and "difluoro-based organic solvent" may refer to a compound containing two fluorine (F) atoms in one molecule.

In exemplary embodiments, the monofluoro-based organic solvent may be represented by Chemical Formula 1 below.

$F—R^1$ [Chemical Formula 1]

In Chemical Formula 1, $R^1$ is a substituted or unsubstituted $C_1$-$C_6$ alkyl group, a substituted or unsubstituted $C_6$-$C_{12}$ aryl group, a substituted or unsubstituted $C_5$-$C_{12}$ cycloalkyl group, a substituted or unsubstituted $C_5$-$C_{12}$ cycloalkenyl group, a substituted or unsubstituted 5 to 7 membered heterocycloalkyl group, or a substituted or unsubstituted 5 to 7 membered heterocycloalkenyl group.

For example, the above-described monofluoro-based organic solvent is included in the non-aqueous organic solvent to sufficiently improve an oxidation resistance of the battery while preventing a reduction of a capacity retention due to an excessive addition of the difluoro-based organic solvent described below.

In an embodiment, the monofluoro-based organic solvent may include fluoroethylene carbonate (FEC).

In exemplary embodiments, the difluoro-based organic solvent may be represented by Chemical Formula 2 below.

[Formula 2]

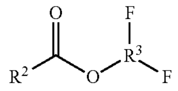

In Chemical Formula 2, $R^2$ may be a hydrocarbon containing a substituted or unsubstituted $C_1$-$C_6$ alkyl group or a substituted or unsubstituted $C_6$-$C_{12}$ aryl group, and $R^3$ may be a hydrocarbon including a substituted or unsubstituted $C_1$-$C_6$ alkyl group or a substituted or unsubstituted $C_1$-$C_6$ alkenyl group.

For example, a substituent included in $R^1$ to $R^3$ may include at least one selected from the group consisting of a halogen, a $C_1$-$C_6$ alkyl group, a $C_3$-$C_6$ cycloalkyl group, a $C_1$-$C_6$ alkoxy group, a 3 to 7 membered hetero cycloalkyl group, a $C_6$-$C_{12}$ aryl group, a 5 to 7 membered heteroaryl group, a hydroxyl group(—OH), $—NR^4R^5$ ($R^4$ and $R^5$ are each independently hydrogen or a $C_1$-$C_6$ alkyl group), a nitro group ($—NO_2$) and a cyano group (—CN).

For example, a fluorine content in the electrolyte may be increased by using the above-described difluoro-based organic solvent together with the monofluoro-based organic solvent. In this case, the oxidation resistance of the secondary battery may be improved. Accordingly, life-span properties of the secondary battery may be improved and an amount of gas generated at a high temperature may be reduced.

For example, if only the mono-fluoro organic solvent is used, sufficient fluorine content in the electrolyte may not be achieved, and the oxidation resistance of the battery may not be sufficiently improved.

In one embodiment, the difluoro-based organic solvent may include difluoroethyl acetate (DFA).

In exemplary embodiments, a weight ratio of the difluoro-based organic solvent relative to the monofluoro-based organic solvent may be greater than 3, and less than or equal to 11.

For example, if the weight ratio is 3 or less, the fluorine content in the electrolyte solution becomes excessively low, the oxidation resistance and chemical resistance of the secondary battery may be deteriorated. In this case, side reactions between electrodes of the secondary battery and the electrolyte may be increased. Accordingly, when the secondary battery is stored at a high temperature, or repeatedly charged and discharged, the gas generation may be increased and storage and life-span properties may be deteriorated.

For example, if the weight ratio exceeds 11, the fluorine content in the electrolyte solution may be excessively increased, and the capacity retention during high temperature storage or repeated charging and discharging may be decreased.

Accordingly, the high-temperature storage and life-span properties of the secondary battery may be deteriorated.

For example, when the weight ratio exceeds 3, and is 11 or less, the oxidation resistance and chemical resistance of the secondary battery may be sufficiently improved to improve the high-temperature storage and life-span properties while appropriately adjusting the fluorine content to prevent the reduction of the capacity retention.

In a preferable embodiment, the weight ratio may be in a range from 4.5 to 9. In this case, the above-described high-temperature storage and life-span properties of the secondary battery may be further improved.

In exemplary embodiments, the non-aqueous organic solvent may further include at least one of a carbonate-based solvent, an ester-based solvent, an ether-based solvent, a ketone-based solvent, an alcohol-based solvent and an aprotic solvent. These may be used alone or in combination thereof.

For example, the carbonate-based solvent may include at least one of dimethyl carbonate (DMC), ethyl methyl carbonate (EMC), methyl propyl carbonate, ethyl propyl carbonate, diethyl carbonate (DEC), dipropyl carbonate, propylene carbonate (PC), ethylene carbonate (EC) and butylene carbonate.

For example, the ester-based solvent may include at least one of methyl acetate (MA), ethyl acetate (EA), n-propyl acetate (n-PA), 1,1-dimethylethyl acetate (DMEA), methyl propionate (MP), ethyl propionate (EP), γ-butyrolactone (GBL), decanolide, valerolactone, mevalonolactone and caprolactone.

For example, the ether-based solvent may include at least one of dibutyl ether, tetraethylene glycol dimethyl ether (TEGDME), diethylene glycol dimethyl ether (DEGDME), dimethoxyethane, tetrahydrofuran (THF) and 2-methyltetrahydrofuran.

For example, the ketone-based solvent may include cyclohexanone, etc.

For example, the alcohol-based solvent may include at least one of ethyl alcohol and isopropyl alcohol.

For example, the aprotic solvent may include at least one of a nitrile-based solvent, an amide-based solvent (e.g., dimethylformamide), a dioxolane-based solvent (e.g., 1,3-dioxolane) and a sulfolane-based solvent.

In exemplary embodiments, a lithium salt may be provided as an electrolyte. For example, the lithium salt may be expressed as $Li^+X^-$.

For example, the anion $X^-$ may be $F^-$, $Br^-$, $I^-$, $NO_3^-$, $N(CN)_2^-$, $BF_4^-$, $ClO_4^-$, $PF_6^-$, $SbF_6^-$, $AsF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$ and $PO_2F_2^-$. These may be used alone or in a combination thereof.

In some embodiments, the lithium salt may include at least one of lithium tetrafluoroborate ($LiBF_4$), lithium hexafluorophosphate ($LiPF_6$), and lithium difluorophosphate ($LiPO_2F_2$). In this case, a film having improved thermal stability may be formed on a surface of the electrode. Accordingly, improved ion conductivity and electrode protection properties of the non-aqueous electrolyte may be implemented.

In an embodiment, the lithium salt may be included in a concentration from about 0.01 to 5M, preferably from about 0.01 to 2M with respect to the non-aqueous organic solvent. Within the above range, transfer of lithium ions and/or electrons may be promoted during charging and discharging of the lithium secondary battery, so that improved capacity may be achieved.

In exemplary embodiments, the additive may include a boron-based compound.

For example, the boron-based compound may include at least one of lithium bis(oxalate) borate (LiBOB), tris(trimethylsilyl) borate (TMSB) and lithium difluoro(oxalato) borate (LiFOB).

When the above-described boron-based compound is included as the additive, a side reaction between the fluorine-based organic solvent and an anode may be suppressed. Accordingly, deterioration of the storage and life-span properties of the anode may be prevented while using the monofluoro-based organic solvent and the difluoro-based organic solvent as described above.

In some embodiments, a content of the additive based on a total weight of the non-aqueous electrolyte may be in a range from 0.1 wt % to 1.0 wt %. In this case, an excessive increase of the battery resistance may be avoided while improving high-temperature storage and life-span properties by using to the additive. Thus, degradation of capacity and power properties may be prevented while improving the high-temperature storage properties of the secondary battery.

In exemplary embodiments, the above-described non-aqueous electrolyte solution may further include an auxiliary additive including an alkyl sultone-based compound and an alkenyl sultone-based compound.

For example, the alkyl sultone-based compound may include at least one of 1,3-propane sultone (PS) and 1,4-butane sultone.

For example, the alkenyl sultone-based compound may include at least one of ethensultone, 1,3-propene sultone (PRS), 1,4-butene sultone and 1-methyl-1,3-propene sultone.

The above-described auxiliary additive may further include an anhydride-based compound such as succinic anhydride and maleic anhydride, a nitrile-based compound such as glutaronitrile, succinonitrile and adiponitrile. These may be used alone or in a combination thereof in addition to the above-mentioned sultone-based compound.

In an embodiment, the auxiliary additive may further include at least one of polyethylene sulfide (PES), vinylene carbonate (VC) and vinylethylene carbonate (VEC).

In some embodiments, a content of the auxiliary additive based on to the total weight of the non-aqueous electrolyte may be 0.8 wt % to 1.6 wt %. In this case, the above-described side reaction of the additive may be further suppressed while suppressing an excessive increase of the battery resistance. Accordingly, the reduction of capacity may be suppressed while maintaining or improving the life-span properties of the secondary battery by using the above-described monofluoro-based organic solvent and difluoro-based organic solvent.

A lithium secondary battery according to exemplary embodiments of the present invention may include a cathode, an anode facing the cathode and the above-described non-aqueous electrolyte.

Figure 2:
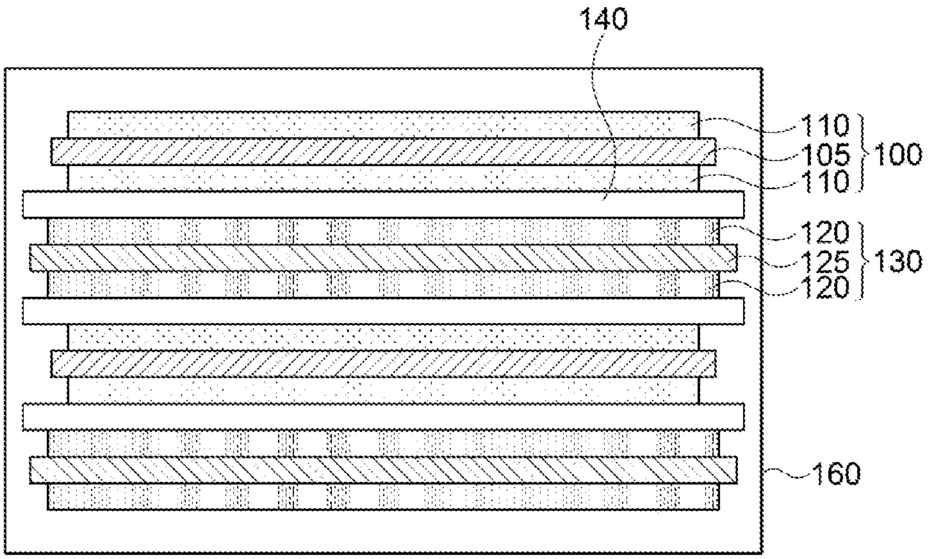

FIGS. 1 and 2 are a schematic plan view and a schematic cross-sectional view, respectively, illustrating a lithium secondary battery in accordance with exemplary embodiments. For example, FIG. 2 is a cross-sectional view taken along line I-I' of FIG. 1.

Referring to FIGS. 1 and 2, a lithium secondary battery may include a cathode 100 and an anode 130 facing the cathode 100.

The cathode 100 may include a cathode current collector 105 and a cathode active material layer 110 formed on the cathode current collector 105.

For example, the cathode active material layer 110 may include a cathode active material and a binder, and may further include a conductive material.

For example, a cathode slurry may be prepared by mixing and stirring the cathode active material in a solvent with the cathode binder, the conductive material, a dispersive agent, etc. The cathode slurry may be coated on the cathode current collector 105, and then dried and pressed to form the cathode 100.

The cathode current collector 105 may include stainless-steel, nickel, aluminum, titanium, copper or an alloy thereof. Preferably, aluminum or an alloy thereof may be used.

The cathode active material may include a lithium metal oxide particle capable of reversibly intercalating and de-intercalating lithium ions. The cathode active material may include, e.g., a lithium metal oxide containing a metal element such as nickel, cobalt, manganese, aluminum, etc.

For example, the lithium metal oxide may be represented by Chemical Formula 3 below.

$$Li_aNi_xM_{1-x}O_{2+y} \qquad \text{[Chemical Formula 3]}$$

In Chemical Formula 1, $0.9 \le a \le 1.2$, $0.5 \le x \le 0.99$, $-0.1 \le y \le 0.1$, and M may include at least one element selected from Na, Mg, Ca, Y, Ti, Hf, V, Nb, Ta, Cr, Mo, W, Mn, Co, Fe, Cu, Ag, Zn, B, Al, Ga, C, Si, Sn, Ba and Zr.

As a content of Ni in the cathode active material or the lithium metal oxide is increased, chemical stability and high-temperature storage stability of the secondary battery may be relatively deteriorated. Further, surface damages of the cathode active material or a side reaction with the non-aqueous electrolyte due to repeated charge/discharge cycles may be caused, and high power/high capacity properties from the high-Ni content may not be sufficiently implemented.

However, as described above, the additive having the predetermined chemical structure may capture/remove active oxygen around the cathode active material or in the non-aqueous electrolyte. Accordingly, high power/high capacity properties from the high-Ni content (e.g., 80 mol % or more of Ni) may be substantially uniformly maintained for a long period even in a high temperature environment.

For example, the binder may include an organic based binder such as polyvinylidenefluoride (PVDF), a polyvinylidene fluoride-hexafluoropropylene copolymer (PVDF-co-HFP), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power of the lithium secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The anode 130 may include an anode current collector 125 and an anode active material layer 120 formed by coating an anode active material on the anode current collector 125.

The anode active material may include a widely known material in the related art which may be capable of adsorbing and ejecting lithium ions. For example, the anode active material may include a carbon-based material such as a crystalline carbon, an amorphous carbon, a carbon complex, a carbon fiber, etc., a lithium alloy, a silicon-based material, tin, etc.

The amorphous carbon may include, e.g., a hard carbon, cokes, a mesocarbon microbead (MCMB), a mesophase pitch-based carbon fiber (MPCF), etc.

The crystalline carbon may include, e.g., an artificial graphite, natural graphite, graphitized cokes, graphitized MCMB, graphitized MPCF, etc.

For example, the lithium alloy may include a metal element such as aluminum, zinc, bismuth, cadmium, antimony, silicon, lead, tin, gallium, indium, etc.

The silicon-based compound may include, e.g., silicon oxide, a silicon-carbon composite compound such as silicon carbide (SiC).

For example, the anode active material may be mixed and stirred together with the above-described binder and conductive material, a thickener, etc., in a solvent to form a slurry. The slurry may be coated on at least one surface of the anode current collector 125, dried and pressed to obtain the anode 130.

A separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without a loss by, e.g., precipitation or sedimentation.

In exemplary embodiments, an electrode cell may be defined by the cathode 100, the anode 130 and the separation layer 140, and a plurality of the electrode cells may be stacked to form an electrode assembly 150 that may have e.g., a jelly roll shape. For example, the electrode assembly 150 may be formed by winding, laminating or folding the separation layer 140.

The electrode assembly 150 may be accommodated together with the non-aqueous electrolyte according to exemplary embodiments in a case 160 to define the lithium secondary battery. In exemplary embodiments, a non-aqueous electrolyte including the above-described additive and auxiliary additive may be used.

As illustrated in FIG. 1, electrode tabs (a cathode tab and an anode tab) may protrude from the cathode current collector 105 and the anode current collector 125 included in each electrode cell to one side of the case 160. The electrode tabs may be welded together with the one side of the case 160 to be connected to an electrode lead (a cathode lead 107 and an anode lead 127) that may be extended or exposed to an outside of the case 160.

The lithium secondary battery may be fabricated into a cylindrical shape using a can, a prismatic shape, a pouch shape, a coin shape, etc.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

(1) Preparation of Non-Aqueous Electrolyte

A 1M $LiPF_6$ solution was prepared using a mixed solvent of PC/FEC/EMC/DFA (21:5:29:45; weight ratio). Thereafter, lithium bisoxalato borate (LiBOB) as an additive was added and mixed with the solution with an amount of 0.8 wt % based on a total weight of the non-aqueous electrolyte.

Additionally, 0.3 wt % by weight of 1,3-propanesultone (PS), 0.7 wt % by weight of 1,3-propenesultone (PRS) and 0.5 wt % of polyethylene sulfide (PES) (total 1.5 wt %) as auxiliary additives based on the total weight of the non-aqueous electrolyte %) was added and mixed to prepare a non-aqueous electrolyte.

(2) Fabrication of Lithium Secondary Battery

A slurry was prepared by mixing Li[Ni0.8Co0.1Mn0.1]$O_2$ as a cathode active material, carbon black as a conductive material and polyvinylidene fluoride (PVdF) as a binder in a weight ratio of 92:5:3. The slurry was uniformly coated on an aluminum foil having a thickness of 15 μm and vacuum dried at 130° C. to prepare a cathode for a lithium secondary battery.

An anode slurry containing 95 wt % of natural graphite as an anode active material, 1 wt % of Super-P as a conductive material, 2 wt % of styrene-butadiene rubber (SBR) as a binder and 2 wt % of carboxymethyl cellulose (CMC) as a thickener was prepared. The anode slurry was uniformly coated on a copper foil having a thickness of 15 μm, dried and pressed to form an anode.

The cathode and the anode prepared as described above were each notched by a predetermined size, and stacked with a separator (polyethylene, thickness: 20 μm) interposed therebetween to form an electrode cell. Each tab portion of the cathode and the anode was welded. The welded cathode/separator/anode assembly was inserted in a pouch, and three sides of the pouch except for an electrolyte injection side were sealed. The tab portions were also included in sealed portions. The non-aqueous electrolyte as prepared in the above (1) was injected through the electrolyte injection side, and then the electrolyte injection side was also sealed. Impregnation was performed for more than 12 hours to obtain a lithium secondary battery.

Example 2

A non-aqueous electrolyte and a lithium secondary battery were prepared by the same method as that in Example 1, except that a mixed solvent of PC/FEC/EMC/DFA(21:6:28:45; weight ratio) was used as the non-aqueous organic solvent when preparing the non-aqueous electrolyte.

Example 3

A non-aqueous electrolyte and a lithium secondary battery were prepared by the same method as that in Example 1, except that a mixed solvent of PC/FEC/EMC/DFA(21:8:26:45; weight ratio) was used as the non-aqueous organic solvent when preparing the non-aqueous electrolyte.

Example 4

A non-aqueous electrolyte and a lithium secondary battery were prepared by the same method as that in Example 1, except that a mixed solvent of PC/FEC/EMC/DFA(21:10:24:45; weight ratio) was used as the non-aqueous organic solvent when preparing the non-aqueous electrolyte.

Example 5

A non-aqueous electrolyte and a lithium secondary battery were prepared by the same method as that in Example 1, except that a mixed solvent of PC/FEC/EMC/DFA(21:13:21:45; weight ratio) was used as the non-aqueous organic solvent when preparing the non-aqueous electrolyte.

Example 6

A non-aqueous electrolyte and a lithium secondary battery were prepared by the same method as that in Example 1, except that LiBOB was added as the additive in an amount of 0.08 wt % based on the total weight of the non-aqueous electrolyte when preparing the non-aqueous electrolyte.

Example 7

A non-aqueous electrolyte and a lithium secondary battery were prepared by the same method as that in Example 1, except that LiBOB was added as the additive in an amount of 1.1 wt % based on the total weight of the non-aqueous electrolyte when preparing the non-aqueous electrolyte.

Example 8

A non-aqueous electrolyte and a lithium secondary battery were prepared by the same method as that in Example 1, except that 0.2 wt % of PS and 0.5 wt % of PRS (total 0.7 wt %) were added as the auxiliary additive based on the total weight of the nonaqueous electrolyte when preparing the non-aqueous electrolyte.

Example 9

A non-aqueous electrolyte and a lithium secondary battery were prepared by the same method as that Example 1, except that 0.2 wt % of PS, 0.5 wt % PRS and 0.2 wt % of PES (total 0.9 wt %) were added as the auxiliary additive based on the total weight of the non-aqueous electrolyte when preparing the non-aqueous electrolyte.

Example 10

A non-aqueous electrolyte and a lithium secondary battery were prepared by the same method as that in Example 1, except that 0.5 wt % of PS, 0.7 wt % of PRS and 0.5 wt % of PES (total 1.7 wt %) were added as the auxiliary additive based on the total weight of the nonaqueous electrolyte when preparing the non-aqueous electrolyte.

Comparative Example 1

A non-aqueous electrolyte and a lithium secondary battery were prepared by the same method as that in Example 1, except that a mixed solvent of EC/EMC (25:75; weight ratio) was used as the non-aqueous organic solvent when preparing the non-aqueous electrolyte.

Comparative Example 2

A non-aqueous electrolyte and a lithium secondary battery were prepared by the same method as that in Example 1, except that a mixed solvent of PC/EMC/DFA (21:58:21; weight ratio) was used as the non-aqueous organic solvent when preparing the non-aqueous electrolyte.

Comparative Example 3

A non-aqueous electrolyte and a lithium secondary battery were prepared by the same method as that in Example 1, except that a mixed solvent of PC/EMC/FEC (21:58:21; weight ratio) was used as the non-aqueous organic solvent when preparing the non-aqueous electrolyte.

Comparative Example 4

A non-aqueous electrolyte and a lithium secondary battery were prepared by the same method as that in Example 1, except that a mixed solvent of PC/FEC/EMC/DFA (21:4:30:45; weight ratio) was used as the non-aqueous organic solvent when preparing the non-aqueous electrolyte.

Comparative Example 5

A non-aqueous electrolyte and a lithium secondary battery were prepared by the same method as that in Example 1, except that a mixed solvent of PC/FEC/EMC/DFA (21:15:19:45; weight ratio) was used as the non-aqueous organic solvent when preparing the non-aqueous electrolyte.

The types and contents of the additives and auxiliary additives used in the above-described Examples and Comparative Examples are shown in Table 1 below.

TABLE 1

| No. | weight ratio of difluoro-based organic solvent relative to monofluoro-based organic solvent | additive content (wt %) | auxiliary additive content (중량%) |
|---|---|---|---|
| Example 1 | 9 | 0.8 | 1.5 |
| Example 2 | 7.5 | 0.8 | 1.5 |
| Example 3 | 5.625 | 0.8 | 1.5 |
| Example 4 | 4.5 | 0.8 | 1.5 |
| Example 5 | 3.46 | 0.8 | 1.5 |
| Example 6 | 9 | 0.08 | 1.5 |
| Example 7 | 9 | 1.1 | 1.5 |
| Example 8 | 9 | 0.8 | 0.7 |
| Example 9 | 9 | 0.8 | 0.9 |
| Example 10 | 9 | 0.8 | 1.7 |
| Comparative Example 1 | — | 0.8 | 1.5 |
| Comparative Example 2 | — | 0.8 | 1.5 |
| Comparative Example 3 | — | 0.8 | 1.5 |
| Comparative Example 4 | 11.25 | 0.8 | 1.5 |
| Comparative Example 5 | 3 | 0.8 | 1.5 |

EXPERIMENTAL EXAMPLE

(1) Evaluation on Initial Performance

1) Initial Capacity Evaluation

The lithium secondary batteries of Examples and Comparative Examples were charged (CC/CV ⅓ C 4.2V 0.05 C CUT-OFF) and discharged (CC ⅓ C 2.5V CUT-OFF), and then an initial discharge capacity was measures.

2) Evaluation on Discharge DCIR

C-rates were increased or decreased sequentially as 0.2 C, 0.5 C, 1.0 C, 1.5 C, 2.0 C, 2.5 C and 3.0 C at the point where an SOC (State of Charge) of each lithium secondary battery of Examples and Comparative Examples was set to 60%. When the charging and discharging of the corresponding C-rate was performed for 10 seconds, an end point of a voltage was estimated by an equation of a straight line, and a slope was adopted as a DCIR (Direct Current Internal Resistance).

(2) Evaluation of High Temperature Storage Properties (60° C.)

The lithium secondary batteries according to the above-described Examples and Comparative Examples were left in a chamber at 60° C. for 8 weeks, and then the following evaluations were performed.

1) Evaluation on Capacity Retention (60° C.)

The lithium secondary battery was discharged (CC ⅓ C 2.5V CUT-OFF) to measure a discharge capacity. The discharge capacity was calculated as a percentage by being divided by the initial capacity measured in Experimental Example (1) 1).

The measurement of the discharge capacity was performed by the same method as that in Experimental Example (1) 1).

2) Measurement of Gas Generation

The lithium secondary battery left for 8 weeks in the chamber at 60° C. was further left for 4 weeks under the same conditions, and then left at room temperature for 30 minutes and placed in a chamber to measure a gas generation. After forming a vacuum in the chamber, nitrogen gas was filled to form a normal pressure, and then a nitrogen volume ($V_0$) and a chamber inner pressure ($P_0$) were measured. After forming a vacuum at an inside of the chamber again, a hole was formed in the battery, and an inner pressure of the chamber ($P_1$) was measured, and an amount of gas generation was calculated according as follows.

$$\text{Gas generation amount (mL)}=(V_0/P_0)*P_1$$

(3) Evaluation of High Temperature Life-Span Properties (45° C.)

The lithium secondary batteries according to the above-described Examples and Comparative Examples were charged (CC/CV ⅓ C 4.2V 0.05 C CUT-OFF) and discharged (CC ⅓ C 2.5V CUT-OFF) in a 45° C. chamber 1,000 times.

1) Evaluation of Capacity Retention (45° C.)

A capacity retention of the lithium secondary battery was calculated as a percentage by dividing a discharge capacity measured at the 1,000th cycle by an initial capacity measured in Experimental Example (1) 1).

$$\text{Capacity retention}=(\text{1,000th discharge capacity}/\text{initial capacity})\times 100\ (\%)$$

2) Measurement of Gas Generation

An amount of gas generation amount was measured by the same method as that in Experimental Example (2) 2) for the lithium secondary battery in which charging and discharging were repeatedly performed 1,000 times in a chamber at 45° C.

(4) Measurement of the Number of Cycles of Charge and Discharge when a Room Temperature Capacity Retention Became 90% (25° C.)

Charge (CC/CV ⅓ C 4.2V 0.05 C CUT-OFF) and discharge (CC ⅓ C 2.5V CUT-OFF) at room temperature (25° C.) for the lithium secondary battery according to the above-described Examples and Comparative Examples was repeated until the capacity retention reached 90%, and the number of repeated cycles was measured.

The evaluation results are shown in Tables 2 and 3 below.

TABLE 2

| No. | initial performance: initial capacity (mAh) | initial performance: DCIR (mΩ) | high temperature storage (60° C.): capacity retention (%) | high temperature storage (60° C.): gas generation (mL) |
|---|---|---|---|---|
| Example 1 | 1,870 | 40.01 | 85 | 22.67 |
| Example 2 | 1,865 | 41.11 | 87 | 23.28 |
| Example 3 | 1,852 | 41.72 | 90 | 24.75 |
| Example 4 | 1,858 | 42.30 | 92 | 25.82 |
| Example 5 | 1,855 | 42.74 | 93 | 26.90 |
| Example 6 | 1,860 | 39.91 | 85 | 28.11 |
| Example 7 | 1,821 | 45.90 | 89 | 22.54 |
| Example 8 | 1,866 | 40.22 | 84 | 30.24 |
| Example 9 | 1,851 | 42.23 | 88 | 26.71 |
| Example 10 | 1,815 | 46.19 | 90 | 23.17 |
| Comparative Example 1 | 1,864 | 42.10 | 65 | 54.98 |
| Comparative Example 2 | 1,870 | 40.93 | 70 | 46.20 |
| Comparative Example 3 | 1,855 | 39.52 | 74 | 45.92 |
| Comparative Example 4 | 1,849 | 40.05 | 75 | 17.50 |
| Comparative Example 5 | 1,860 | 40.98 | 91 | 42.78 |

TABLE 3

| No. | high temperature life-span (45° C.): capacity retention (%, 1000 cycles) | high temperature life-span (45° C.): gas generation (mL) | Number of charge/discharge cycles when reaching 90% capacity retention at room temperature (25° C.) |
|---|---|---|---|
| Example 1 | 80 | 14.88 | 340 |
| Example 2 | 81 | 15.26 | 342 |
| Example 3 | 83 | 16.10 | 376 |
| Example 4 | 84 | 17.98 | 430 |
| Example 5 | 86 | 19.22 | 452 |
| Example 6 | 78 | 23.64 | 315 |
| Example 7 | 83 | 17.52 | 371 |
| Example 8 | 76 | 24.11 | 310 |
| Example 9 | 80 | 19.10 | 332 |
| Example 10 | 82 | 18.05 | 380 |
| Comparative Example 1 | 63 | 168.3 | 117 |
| Comparative Example 2 | 65 | 107.1 | 172 |
| Comparative Example 3 | 68 | 98.51 | 166 |
| Comparative Example 4 | 70 | 22.30 | 264 |
| Comparative Example 5 | 85 | 53.28 | 480 |

Referring to Tables 2 and 3, Examples of the present application where the weight ratio of the difluoro-based organic solvent to the monofluoro-based organic solvent exceeded 3 and was 11 or less provided the high-temperature storage and life-span properties and the capacity retention at room temperature greater than those of Comparative Examples.

In Example 6 where the additive content was less than 0.5 wt % based on the total weight of the non-aqueous electrolyte, the side reaction of the electrode and the fluorine-based organic solvent was not sufficiently suppressed to provide relatively degraded high temperature storage and life-span properties compared to those from other Examples.

In Example 7 where the additive content was greater than 1.0 wt % based on the total weight of the non-aqueous electrolyte, an excessive amount of the additive was included to increase a battery resistance, and the initial capacity was relatively lowered compared to those of other Examples.

In Example 8 where the content of the auxiliary additive was less than 0.8 wt % based on the total weight of the non-aqueous electrolyte, the amount of the auxiliary additive was decreased and the life-span and storage properties were relatively degraded compared to those from other Examples.

In Example 10 where the content of auxiliary additives was greater than 1.6 wt % based on the total weight of the non-aqueous electrolyte, an excess amount of the auxiliary additive was included, and the battery resistance was increased and the initial capacity was relatively lowered compared to those from other Examples.

In Comparative Example 1 where the fluorine-based organic solvent was not used, the high temperature storage and life-span properties and the room temperature capacity retention were explicitly reduced compared to those of Examples.

In Comparative Example 2 using only the monofluoro-based organic solvent and Comparative Example 3 using only the difluoro-based organic solvent, the high temperature storage and life-span properties and the room temperature capacity retention were explicitly reduced compared to those of Examples.

In Comparative Example 4 where the weight ratio of the difluoro-based organic solvent relative to the monofluoro-based organic solvent exceeded 11, the capacity retentions during the high-temperature storage and the repeated charging/discharging were lower than those of Examples.

In Comparative Example 5 where the weight ratio of the difluoro-based organic solvent relative to the monofluoro-based organic solvent was 3 or less, oxidation resistance and chemical resistance of the secondary battery were reduced compared to those of Examples, and the high temperature storage and life-span properties were degraded.

What is claimed is:

1. A non-aqueous electrolyte, comprising:
- a non-aqueous organic solvent including propylene carbonate (PC), ethyl methyl carbonate (EMC), a monofluoro-based organic solvent and a difluoro-based organic solvent;
- a lithium salt; and
- an additive,
- wherein a total content of propylene carbonate (PC) and ethyl methyl carbonate (EMC) is 45 wt % or more based on the total weight of the non-aqueous organic solvent, and
- wherein a weight ratio of the difluoro-based organic solvent relative to the monofluoro-based organic solvent is in a range from 4.5 to 9.

2. The non-aqueous electrolyte according to claim 1, wherein the monofluoro-based organic solvent is represented by Chemical Formula 1:

F—$R^1$ [Chemical Formula 1]

wherein, in Chemical Formula 1, $R^1$ is a substituted or unsubstituted $C_1$-$C_6$ alkyl group, a substituted or unsubstituted $C_6$-$C_{12}$ aryl group, a substituted or unsubstituted $C_5$-$C_{12}$ cycloalkyl group, a substituted or unsubstituted $C_5$-$C_{12}$ cycloalkenyl group, a substituted or unsubstituted 5 to 7 membered heterocycloalkyl group, or a substituted or unsubstituted 5 to 7 membered heterocycloalkenyl group.

3. The non-aqueous electrolyte according to claim 1, wherein the difluoro-based organic solvent is represented by Chemical Formula 2:

[Chemical Formula 2]

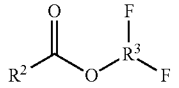

wherein, in Chemical Formula 2, $R^2$ is a hydrocarbon containing a substituted or unsubstituted $C_1$-$C_6$ alkyl group or a substituted or unsubstituted $C_6$-$C_{12}$ aryl group, and $R^3$ is a hydrocarbon containing a substituted or unsubstituted $C_1$-$C_6$ alkyl group or a substituted or unsubstituted $C_1$-$C_6$ alkenyl group.

4. The non-aqueous electrolyte according to claim 1, wherein the additive comprises a boron-based compound.

5. The non-aqueous electrolyte according to claim 4, wherein the boron-based compound includes at least one of lithium bis(oxalate) borate (LiBOB), tris(trimethylsilyl) borate (TMSB) and lithium difluoro(oxalato) borate(LiFOB).

6. The non-aqueous electrolyte according to claim 1, wherein a content of the additive is in a range from 0.1 wt % to 1.0 wt % based on a total weight of the non-aqueous electrolyte.

7. The non-aqueous electrolyte according to claim 1, further comprising an auxiliary additive comprising an alkyl sultone-based compound and an alkenyl sultone-based compound.

8. The non-aqueous electrolyte according to claim 7, wherein a content of the auxiliary additive is in a range from 0.8 wt % to 1.6 wt % based on a total weight of the non-aqueous electrolyte.

9. The non-aqueous electrolyte according to claim 1, wherein the lithium salt includes at least one of lithium tetrafluoroborate ($LiBF_4$), lithium hexafluorophosphate ($LiPF_6$) and lithium difluorophosphate ($LiPO_2F_2$).

10. A lithium secondary battery, comprising:

a cathode;

an anode facing the cathode; and the non-aqueous electrolyte of claim 1.

* * * * *